United States Patent
Saitoh et al.

(10) Patent No.: US 10,067,021 B2
(45) Date of Patent: Sep. 4, 2018

(54) PRESSURE SENSOR HAVING RESISTIVE BODIES

(71) Applicant: SMC CORPORATION, Chiyoda-ku (JP)

(72) Inventors: Mitsuhiro Saitoh, Koshigaya (JP); Yuta Oshima, Moriya (JP); Takeshi Yamagishi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/179,163

(22) Filed: Jun. 10, 2016

(65) Prior Publication Data

US 2017/0082513 A1 Mar. 23, 2017

(30) Foreign Application Priority Data

Sep. 18, 2015 (JP) .................................. 2015-185684

(51) Int. Cl.
*G01L 9/12* (2006.01)
*G01L 9/06* (2006.01)
*G01L 9/00* (2006.01)

(52) U.S. Cl.
CPC .......... *G01L 9/0051* (2013.01); *G01L 9/0044* (2013.01)

(58) Field of Classification Search
None
See application file for complete search history.

(56) References Cited

U.S. PATENT DOCUMENTS

| 3,258,971 A | * | 7/1966 | Padgett | ................. G01L 9/0055 73/384 |
| 5,315,878 A | * | 5/1994 | Birenheide | ........... G01L 9/0051 200/83 N |
| 5,861,558 A | * | 1/1999 | Buhl | ..................... G01L 9/0055 73/721 |
| 5,974,893 A | * | 11/1999 | Balcarek | ............. G01L 19/0092 73/714 |

(Continued)

FOREIGN PATENT DOCUMENTS

| EP | 2 175 252 B1 | 9/2013 |
| JP | 60-152949 U | 10/1985 |

(Continued)

OTHER PUBLICATIONS

Office Action dated Jan. 23, 2018 in Japanese Patent Application No. 2015-185684 (with unedited computer generated English translation). 4 pages.

(Continued)

*Primary Examiner* — Andre Allen
(74) *Attorney, Agent, or Firm* — Oblon, McClelland, Maier & Neustadt, L.L.P.

(57) ABSTRACT

A pressure sensor is equipped with a body including a fluid passage in the interior thereof, a holder connected to one end of the body, and a ceramic sensor accommodated in the interior of the holder. Plural protrusions are disposed on an outer edge portion of an end surface of the sensor, which is pressed by the holder. In addition, when the holder is fastened with respect to the body, in a state in which a pressing portion of the holder abuts against the protrusions, a fastening force is applied in an axial direction, and the sensor is fixed.

7 Claims, 5 Drawing Sheets

(56) References Cited

U.S. PATENT DOCUMENTS

| | | | | |
|---|---|---|---|---|
| 6,070,469 | A * | 6/2000 | Taniguchi | G01L 19/0038 73/715 |
| 6,761,073 | B2 | 7/2004 | Otobe et al. | |
| 2001/0015105 | A1 * | 8/2001 | Gerst | G01L 9/0075 73/715 |
| 2002/0053603 | A1 * | 5/2002 | Bernini | G01L 19/0092 237/8 A |
| 2011/0174080 | A1 * | 7/2011 | Zorzetto | G01L 9/0051 73/756 |
| 2011/0296927 | A1 * | 12/2011 | Hopman | G01L 9/0075 73/723 |
| 2015/0075289 | A1 * | 3/2015 | Cogliati | G01L 9/0044 73/721 |
| 2016/0202135 | A1 * | 7/2016 | Sanzari | G01L 9/0079 73/705 |
| 2016/0238477 | A1 * | 8/2016 | Lemery | G01L 9/0042 |
| 2017/0082512 | A1 * | 3/2017 | Saitoh | G01L 9/0052 |
| 2018/0010975 | A1 * | 1/2018 | Seto | G01L 9/0055 |
| 2018/0038753 | A1 * | 2/2018 | May | G01L 27/005 |

FOREIGN PATENT DOCUMENTS

| | | |
|---|---|---|
| JP | 61-96347 U | 6/1986 |
| JP | 63-293432 A | 11/1988 |
| JP | 3-19940 U | 2/1991 |
| JP | 2000-292283 | 10/2000 |
| JP | 2009-85931 | 4/2009 |

OTHER PUBLICATIONS

Office Action dated Jan. 23, 2018 in Japanese Patent Application No. 2015-185686 (with unedited computer generated English translation). 6 pages.

Office Action dated Apr. 3, 2018 in Japanese Patent Application No. 2015-185686 (with unedited computer generated English translation), 7 pages.

Japanese Office Action dated Jun. 12, 2018 for Japanese Patent Application 2015-185686, and English translation.

* cited by examiner

PRESSURE SENSOR HAVING RESISTIVE BODIES

CROSS-REFERENCE TO RELATED APPLICATION

This application is based upon and claims the benefit of priority from Japanese Patent Application No. 2015-185684 filed on Sep. 18, 2015, the contents of which are incorporated herein by reference.

BACKGROUND OF THE INVENTION

Field of the Invention

The present invention relates to a pressure sensor that detects the pressure of a pressure fluid that flows inside a fluid passage.

Description of the Related Art

Heretofore, on a manufacturing line in which water, oil, and a chemical solution or the like are used, a pressure sensor has been used for the purpose of measuring the pressure of such fluids. Such a pressure sensor, for example, as disclosed in Japanese Laid-Open Patent Publication No. 2009-085931, is made up from a body formed in a joint-shape, a ceramic sensor accommodated in the interior of the body, and a thin film that is disposed between the sensor and a port of the body. The thin film is disposed so as to abut against a strain gauge provided on a surface of the sensor.

In addition, in a state in which the sensor is mounted on the thin film inside the body, by screw-engagement and tightening of a holder with respect to the body, an outer edge portion of the thin film is sandwich between the sensor and an inner wall surface of the body, and the thin film abuts against an annular o-ring, which is disposed on the inner wall surface of the body.

With the pressure sensor, the thin film becomes deformed responsive to the pressure of the fluid that is introduced through the port into the interior of the body, and by an amount of distortion of the strain gauge provided on the sensor undergoing a change, the pressure is detected on the basis of an output voltage corresponding to such a change.

SUMMARY OF THE INVENTION

However, with the aforementioned pressure sensor, due to the occurrence of variations in the constituent parts such as bodies, holders, or the like, cases occur in which the weighted and fixed position of a ceramic sensor by the body and the holder thereof is not constant, and such a position is subjected to variability. In accordance therewith, the ceramic sensor is fixed at a position where a strain gauge disposed on the sensor surface becomes distorted, so that an offset voltage, which is a voltage that is output in a state in which pressure is not applied to the sensor, becomes large in magnitude. As a result, adjustment of the offset voltage becomes complicated, which leads to a decrease in productivity.

A general object of the present invention is to provide a pressure sensor, in which electrical calibration can easily be performed by stably fixing the sensor with respect to a body.

The present invention is characterized by a pressure sensor including a body including a fluid passage into which a pressure fluid is introduced, a ceramic sensor disposed on an end of the body and including a thin-film diaphragm portion that faces toward the fluid passage, and a holder connected to the end of the body in a state in which the sensor is accommodated in the interior thereof, wherein the sensor is fixed by being pressed toward the body by a pressing portion formed on an outer edge portion of the holder, wherein, resistive bodies are disposed on the diaphragm portion positioned on a substantially central portion of the sensor, and a protrusion, which projects toward the holder, is disposed at a position facing toward the pressing portion on an outer circumferential side of the resistive bodies.

According to the present invention, in the pressure sensor, the holder, in which the ceramic sensor is accommodated, is connected to an end of the body, and on the sensor, the protrusions that project toward the holder are provided at positions facing toward the pressing portion of the holder.

Consequently, when the holder is assembled onto the body, a load from the pressing portion is applied to the protrusions, which are disposed on the outer circumferential side with respect to the resistive bodies. Therefore, deformation of the diaphragm portion caused by direct application of load to the diaphragm portion on which the resistive bodies are disposed, is suppressed, and the amount of distortion thereof can be made constant.

As a result, by applying the tightening load from the holder evenly with respect to the protrusions, the sensor that constitutes the pressure sensor can be assembled stably with respect to the body, and variations in the detected pressure of the sensor due to variations in the assembly thereof can be suppressed. Therefore, it is possible for an offset voltage caused by strains to be minimized, and calibration of the pressure sensor can be performed easily.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
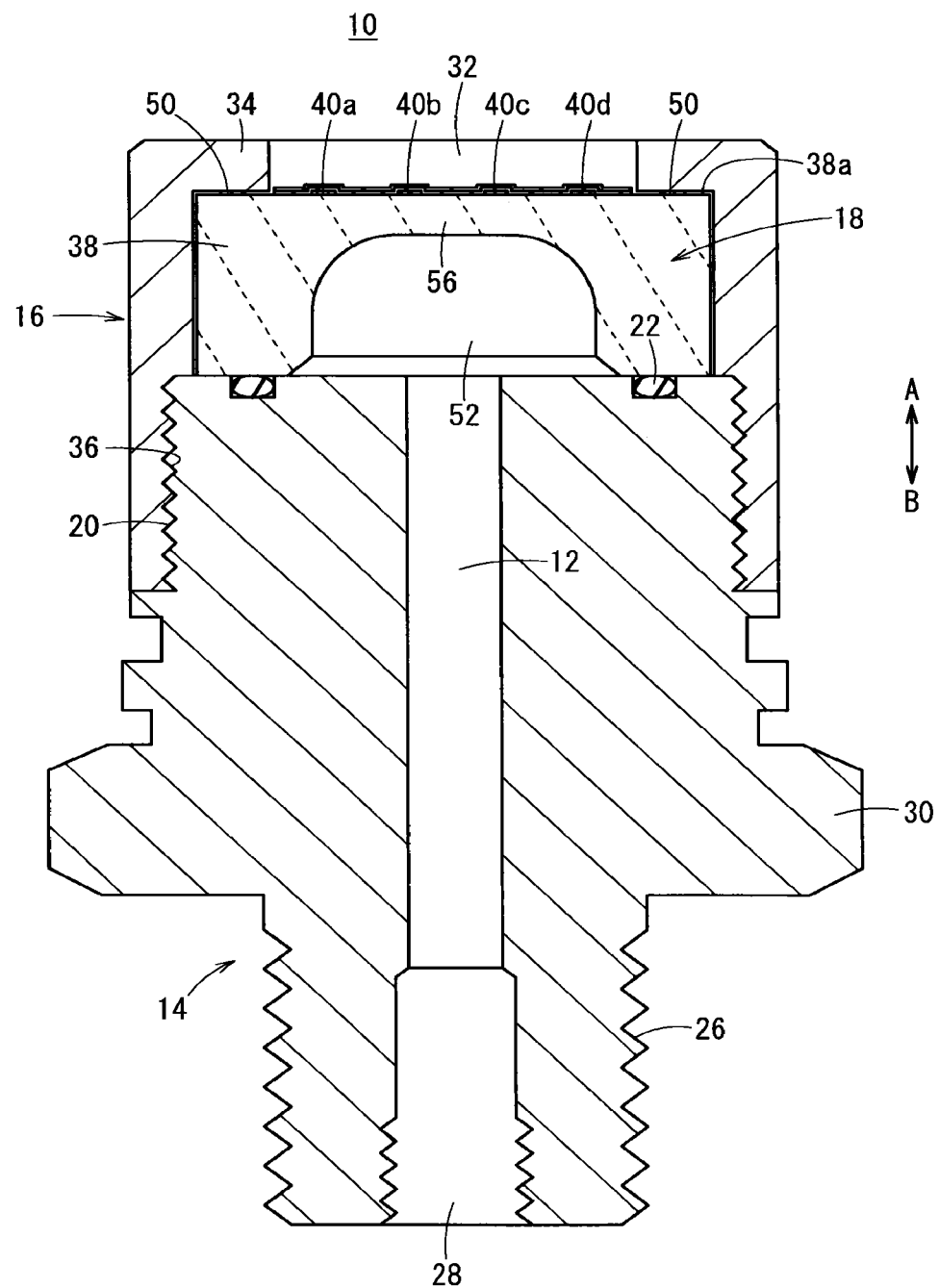
FIG. 1 is an overall cross-sectional view of a pressure sensor according to an embodiment of the present invention.

As shown in FIG. 1, a pressure sensor 10 includes a body 14 having a fluid passage 12 into which a pressure fluid is introduced, a holder 16 mounted on one end of the body 14, and a sensor 18 that is disposed in the interior of the holder 16 between the holder 16 and the body 14.

The body 14, for example, is formed from a metal material, with a first screw section 20 being disposed on an outer circumferential surface of one end thereof that is formed with a circular shape in cross section. A holder 16, which will be described later, is connected integrally with the body 14 by screw-engagement. Further, a sealing ring 22 is disposed through an annular groove on an end surface of the one end, and abuts against a lower surface of the sensor 18 described below. The sealing ring 22 may be either annular or rectangular insofar as it is of a ring shape.

Further, positioning pins 24 (see FIG. 3) are disposed on the one end of the body 14, which project at a predetermined height in a direction (the direction of the arrow A) away from the one end, and are inserted into later-described grooves 54 of the sensor 18.

On the other hand, similar to the one end side, a second screw section 26 is formed on an outer circumferential surface on another end of the body 14. The second screw section 26 is connected by screw-engagement, for example, to a port of a non-illustrated fluid pressure device, and a fluid introduction port 28, which opens in an end surface of the other end, is formed in the center of the other end. In addition, the fluid introduction port 28 is formed along an axial direction (the direction of arrows A and B) in the center of the body 14, and communicates with the fluid passage 12 that penetrates to the one end of the body 14.

Furthermore, a cross-sectional hexagonally shaped nut section 30 is formed on the outer circumferential surface of a substantially central portion of the body 14 along the axial direction (the directions of arrows A and B). By gripping the nut section 30 with a non-illustrated tool and rotating the body 14, the body 14 is connected through the second screw section 26 to a non-illustrated fluid pressure device or the like.

The holder 16, for example, is formed in a bottomed cylindrical shape from a metal material such as brass or stainless steel, etc., and in the center of one end on the bottom thereof, an opening 32 is formed that penetrates in the axial direction (the direction of arrows A and B). In addition, a pressing portion 34 is formed on an outer circumferential portion of the opening 32. Further, on an inner circumferential surface of the other end side (in the direction of the arrow B) in the holder 16, an internally-threaded portion 36 is provided that is screw-engaged with the first screw section 20 of the body 14. In addition, the holder 16 is connected coaxially by screw-engagement through the internally-threaded portion 36 so as to cover the one end of the body 14.

Figure 2:
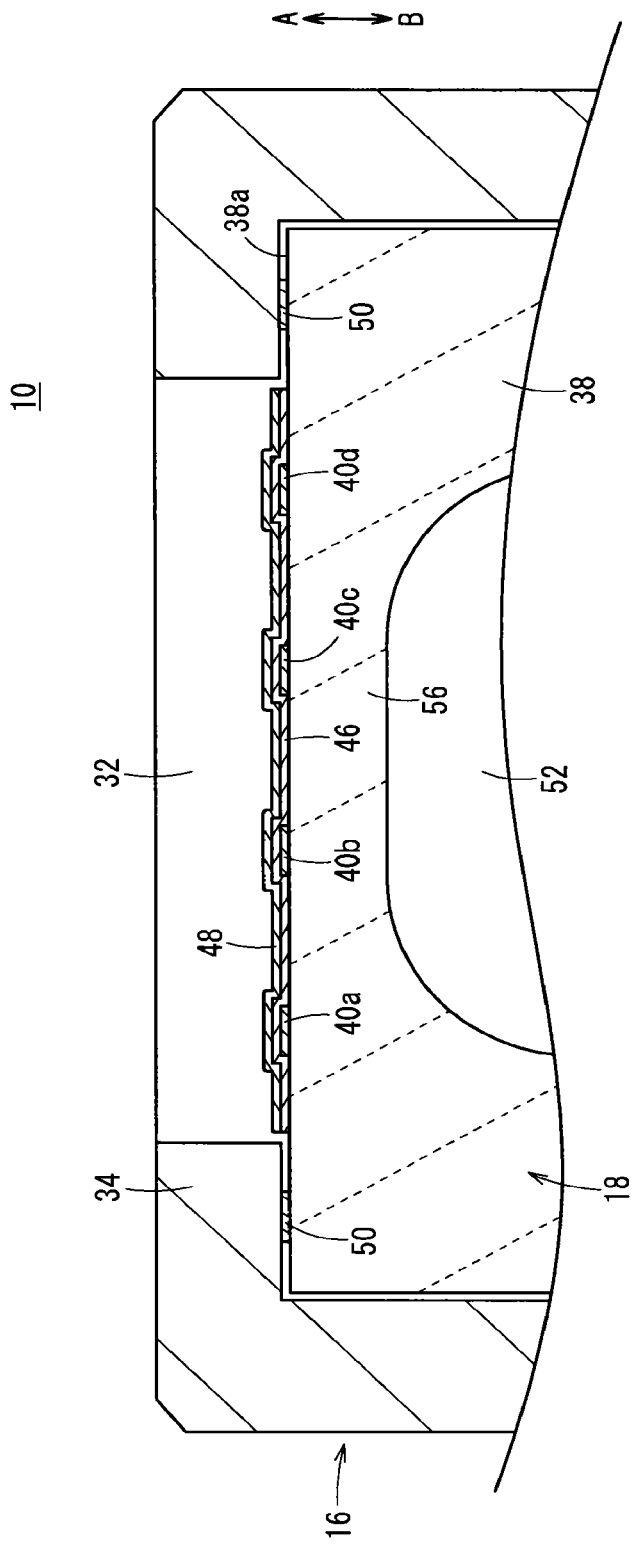
FIG. 2 is an enlarged cross-sectional view showing the vicinity of a sensor of the pressure sensor shown in FIG. 1.
Figure 3:
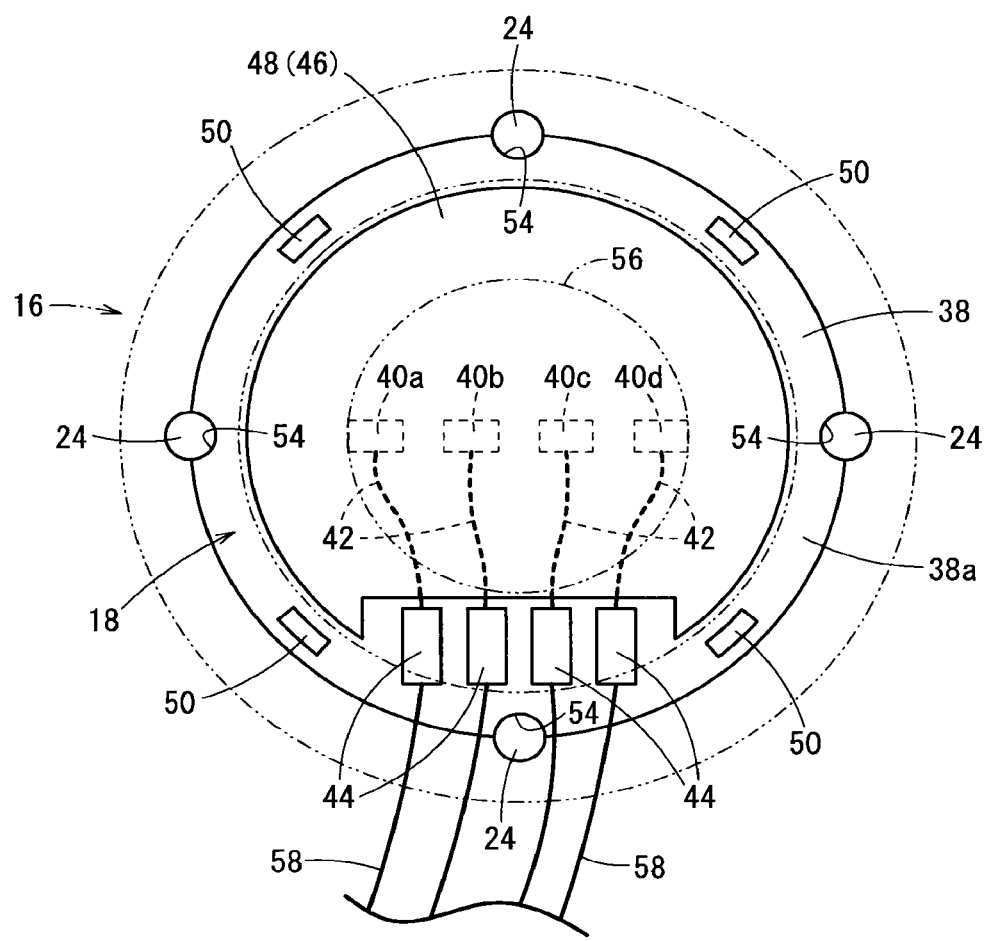
FIG. 3 is a front view of the sensor in the pressure sensor shown in FIG. 1.

As shown in FIGS. 1 through 3, the sensor 18 is formed from a ceramic material such as aluminum oxide ($Al_2O_3$, alumina) or the like. The sensor 18 is made up from a base body 38 that is U-shaped in cross section including a concavity 52 substantially in a center region thereof, plural resistive bodies 40a through 40d that are mounted on an end surface 38a of the base body 38, electrodes 44 connected through wires 42 to the resistive bodies 40a through 40d, first and second protective films 46, 48 that cover the resistive bodies 40a through 40d as a double-layered structure, and a plurality of protrusions 50 that project out from the end surface 38a.

In addition, in a state in which the concavity 52 is arranged so as to face the fluid passage 12 on the side of the body 14 (in the direction of the arrow B), the sensor 18 is accommodated and held between the holder 16 and the body 14.

On an outer circumferential surface of the base body 38, as shown in FIG. 3, for example, multiple grooves 54 are formed, which are recessed radially inward with semicircular shapes in cross section, and extend along the axial direction (the direction of arrows A and B). In addition, when the sensor 18 is assembled onto the one end of the body 14, the positioning pins 24 are inserted respectively into the grooves 54, whereby the sensor 18 is positioned in the circumferential direction. Stated otherwise, rotation of the sensor 18 with respect to the body 14 is restricted.

On the other hand, in a substantially central portion of the base body 38, a substantially circular diaphragm portion 56 having a predetermined thickness is provided on the side of the end surface 38a (in the direction of the arrow A) on an opposite side from the concavity 52. The diaphragm portion 56 is formed more thinly than an outer circumferential region of the base body 38, and a plurality of resistive bodies 40a through 40d, which function as a strain gauge, are disposed on the surface of the diaphragm portion 56. The resistive bodies 40a through 40d are formed by printing and firing, for example, using a thick-film printing technique such as screen printing or the like. The resistive bodies 40a through 40d are arranged in a straight line and are separated mutually at a predetermined distance from each other. Moreover, the resistive bodies 40a through 40d are formed by firing a thick-film resistive paste material of a ruthenium (Ru) base, for example.

Further, the wires 42 that are connected to the resistive bodies 40a through 40d, and the electrodes 44 are fired after being printed using a conductive paste material, and the wires 42 are connected respectively to the electrodes 44, which are disposed on an outer edge portion of the base body 38.

As shown in FIG. 2, the first protective film 46 is disposed with respect to the end surface 38a of the base body 38 so as to cover the resistive bodies 40a through 40d, and is formed by printing and firing a low-melting-point glass. Owing thereto, the resistive bodies 40a through 40d are protected, and the insulating properties thereof are ensured.

The second protective film 48 is disposed so as to cover the first protective film 46, and is formed by printing and firing an organic material such as an epoxy resin, a phenol resin, or the like.

Further, as shown in FIGS. 2 and 3, the plural protrusions 50 are provided on the end surface 38a of the base body 38, and project at predetermined heights from the end surface 38a at positions on the outer side in the radial direction of the diaphragm portion 56. The protrusions 50, for example, are formed with rectangular shapes in cross section, at a height of about 20 to 40 μm with respect to the diaphragm portion 56, and are formed from the same material as the resistive bodies 40a through 40d. Preferably, the protrusions 50 should be formed by printing and firing the same material as the resistive bodies 40a through 40d at the same height as the resistive bodies simultaneously when the resistive bodies 40a through 40d are printed.

The protrusions 50 are provided in a plurality (for example, four) at respective equal angular distances mutually about the center of the base body 38. The positions (angular positions) of the protrusions 50 are set such that, in the case that the holder 16 is screw-engaged and fastened with respect to the body 14, when a load (fastening load) is applied in a vertical direction (the direction of the arrow B) from the holder 16 to the end surface of the sensor 18, the resistive bodies 40a through 40d disposed on the diaphragm portion 56 are less likely to undergo distortion due to the load. Furthermore, preferably, the protrusions 50 are disposed at positions separated radially outward as much as possible with respect to the diaphragm portion 56.

Herein, a case is described in which the protrusions 50 are disposed at four locations that are offset (shifted) by about 45° in the circumferential direction with respect to the respective grooves 54 in the base body 38.

In addition, when the holder 16 and the body 14 are fastened together in a state in which the sensor 18 is accommodated in the interior of the holder 16, the sensor 18 is fixed in a condition where the pressing portion 34 of the holder 16 is placed in abutment against the protrusions 50 of the sensor 18 and a fastening load that is applied in a vertical direction (axial direction) is applied to the protrusions 50.

Further, the above-described first and second protective films 46, 48 may be formed so as to cover the protrusions 50 also.

The pressure sensor 10 according to the embodiment of the present invention is constructed basically as described above. Next, a manufacturing method for the sensor 18 including the resistive bodies 40a through 40d will be described.

First, surface processing is effected by carrying out cleaning, baking, etc., with respect to the base body 38, which is made up from a ceramic material such as aluminum oxide or the like.

Next, after printing of the wires 42 by screen printing or the like using a conductive paste material including, for example, Au, Ag, Pd, Ni, Cu, or the like with respect to the end surface 38a of the aforementioned base body 38, the wires 42 are subjected to binding by firing.

Thereafter, the resistive bodies 40a through 40d are printed and fired using a thick-film resistive paste material of a ruthenium (Ru) base. The plural resistive bodies 40a through 40d are formed in a straight line.

In addition, by printing and firing a low-melting-point glass on the end surface 38a of the base body 38, the first protective film 46 is formed with respect to the end surface 38a so as to cover the resistive bodies 40a through 40d. Owing thereto, the resistive bodies 40a through 40d are protected, and simultaneously, the moisture-proof and insulative properties thereof are ensured.

Next, in order to adjust a variance in the resistance values due to variations in printing of the aforementioned resistive bodies 40a through 40d, trimming of non-illustrated thick-film resistors for adjustment, which are connected in series or in parallel with the resistive bodies 40a through 40d, is carried out, for example, by a laser or the like.

Lastly, the second protective film 48 that is made up from an organic material such as an epoxy resin, a phenol resin, or the like, is printed and fired so as to cover the first protective film 46 for thereby carrying out protection of the trimming members, and manufacturing of the sensor 18 is then completed.

The above-described first and second protective films 46, 48 may be formed so as to cover only the resistive bodies 40a through 40d, or may be disposed up to the vicinity of an outer edge portion of the sensor 18 so as to cover the plurality of protrusions 50 in addition to the resistive bodies.

Next, an assembly method for the pressure sensor 10 including the sensor 18, which is manufactured in the forgoing manner, will be described.

First, in a state in which the other end of the body 14 is arranged downwardly (in the direction of the arrow B), the sealing ring 22 is installed in the annular groove of the one end of the body 14, and the sensor 18 is arranged such that the concavity 52 faces toward the body 14 (in the direction of the arrow B). Owing thereto, a state is brought about in which the concavity 52 of the sensor 18 and the fluid passage 12 of the body 14 are in communication. At this time, by the positioning pins 24 erected on the one end of the body 14 being inserted into the grooves 54 of the sensor 18, the sensor 18 is positioned in the direction of rotation (see FIG. 3).

Next, the cylindrical shaped holder 16 is moved toward the side of the one end of the body 14 so as to cover the sensor 18, and in a state in which the sensor 18 is housed in the interior thereof, the holder 16 is rotated, whereby the internally-threaded portion 36 is screw-engaged with respect to the first screw section 20 of the body 14. In addition, by abutment of the pressing portion 34 of the holder 16 against the protrusions 50 on the sensor 18, the sensor 18 becomes sandwiched and fixed between the holder 16 and the one end of the body 14. Consequently, the sensor 18 is fixed between the body 14 and the holder 16, whereupon assembly of the pressure sensor 10 is brought to an end.

At this time, the fastening load along the axial direction (the direction of the arrow B), which is applied to the end surface 38a of the sensor 18 from the holder 16, is applied to the protrusions 50 that project out from the end surface 38a, and is not applied directly to the end surface 38a. Therefore, distortion of the resistive bodies 40a through 40d, which are disposed on the end surface 38a of the sensor 18, can be suppressed to the greatest possible extent.

Further, the lower surface of the sensor 18 abuts against the sealing ring 22, whereby the pressure fluid, which is introduced into the concavity 52 from the fluid passage 12, is prevented from leaking out toward the outer circumferential side.

Next, operations of the pressure sensor 10, which is assembled in the foregoing manner, will briefly be described. Moreover, in this description, the pressure sensor 10 is placed in a condition in which the other end of the body 14 is screw-engaged and attached to a port of a non-illustrated fluid pressure device.

A pressure fluid from the non-illustrated fluid pressure device is introduced into the fluid passage 12 through the fluid introduction port 28 of the body 14, the pressure fluid flows along the fluid passage 12 toward the side of the sensor 18 (in the direction of the arrow A), and by being introduced into the concavity 52, the diaphragm portion 56 is pressed and flexed (distorted) upwardly (in the direction of the arrow A) by the pressure of the pressure fluid.

Depending on the flexure (distortion) of the diaphragm portion, distortion of the resistive bodies 40a through 40d, which are disposed on the diaphragm portion 56, is caused, and the resistive bodies 40a through 40d convert the distortion into electric signals. Thereafter, the electric signals are output to the electrodes 44 through the wires 42. In addition, voltages are output to a non-illustrated measurement device or the like through respective lead wires 58 connected to the electrodes 44. The pressure of the pressure fluid based on the voltages is then measured.

In the foregoing manner, according to the present embodiment, when the pressure sensor 10 is assembled by screw-engagement of the holder 16 with respect to the body 14, the load from the holder 16 is received by the outer edge portion of the sensor 18, and moreover, by the plural protrusions 50, which are disposed at positions where distortion is unlikely, whereby the occurrence of strains on the diaphragm portion 56 on which the resistive bodies 40a through 40d are disposed is suppressed, and the amount of distortion thereof can be made substantially constant.

As a result, variations in the pressure detected by the sensor 18 due to variations in the assembly of the pressure sensor 10 are suppressed, and accordingly an offset voltage caused by the occurrence of internal stresses can be minimized. Thus, calibration of the pressure sensor 10, which is necessary at the time of manufacturing, can be performed easily.

Further, without special consideration to the distortion of the resistive bodies 40a through 40d, the pressure sensor 10 in which such distortions are suppressed can be constructed merely by assembling the holder 16 with respect to the body 14. As a result, ease of assembly of the pressure sensor 10 can be favorably enhanced.

Furthermore, by providing the protrusions 50, which are formed with the same thickness as the resistive bodies 40a through 40d, on the end surface 38a of the sensor 18, after the first and second protective films 46, 48 have been formed so as to cover the resistive bodies 40a through 40d, by comparing the thickness of the protrusions 50, which are not covered by the first and second protective films 46, 48, the thickness of the resistive bodies 40a through 40d can be confirmed. Owing thereto, after all of the manufacturing steps for the sensor 18 have been completed, by confirmation of the film thickness, quality control can easily be performed.

Further still, even in the event that internal stresses, which are generated when the pressure sensor 10 is assembled, are released, for example, as a result of changes in the ambient temperature, or by application of vibrations and shocks, etc., since the initial offset voltage is suppressed to a minimum, any change in such internal stresses is small. Therefore, changes caused by prolonged use of the pressure sensor 10 also are suppressed to a minimum.

Figure 4A:
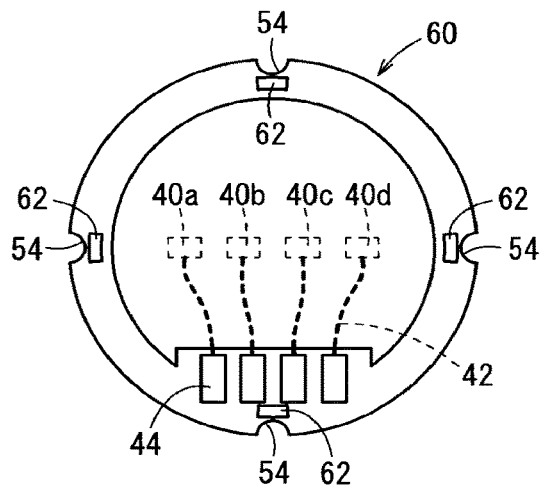
FIGS. 4A through 4D are front views showing sensors according to first through fourth modifications in which the positions, quantities, and shapes of the protrusions differ.

On the other hand, the present invention is not limited to the case described above, in which the protrusions 50 having rectangular shapes in cross section are disposed at positions which are offset (angularly shifted) by 45° each from the grooves 54. For example, as in a sensor 60 shown in FIG. 4A, the protrusions 62 may be disposed respectively at the same angular positions as the grooves 54. More specifically, in the assembled condition of the pressure sensor 10, the protrusions 62 may be arranged at such positions that distortion of the resistive bodies 40a through 40d disposed on the sensor 60 can be suppressed.

Figure 4B:
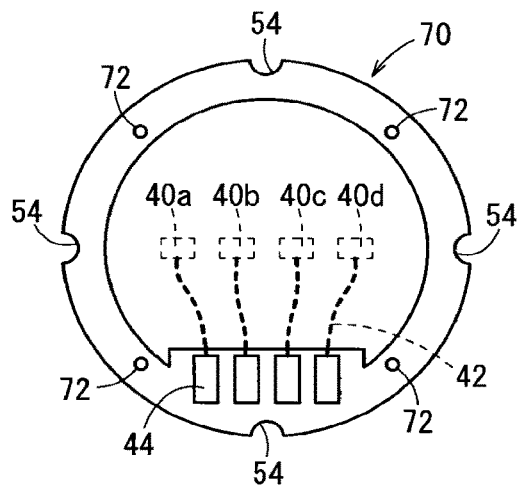

Furthermore, assuming that the protrusions are capable of bearing the fastening load from the holder 16, as in a sensor 70 shown in FIG. 4B, the protrusions 72 may be formed with circular shapes in cross section. By forming the protrusions 72 in this manner, compared to the case of being formed with rectangular shapes in cross section, since the protrusions 72 can be constituted with a smaller size, advantages are obtained in that the degree of freedom in the arrangement of the protrusions 72 is increased, and manufacturing costs are reduced.

Figure 4C:
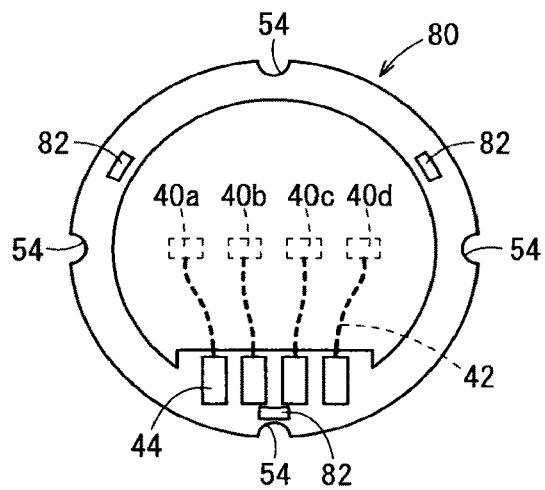
Figure 4D:
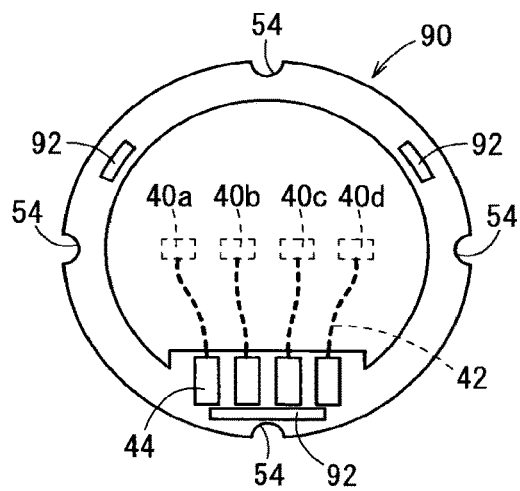

Further still, as in a sensor 80 shown in FIG. 4C, the protrusions 82 may be disposed at three locations separated by equal intervals, and as in a sensor 90 shown in FIG. 4D, the shapes of the protrusions 92 may be formed with different cross-sectional shapes.

Further, the invention is not limited to the case in which the protrusions 50, 62, 72, 82, 92 are separated mutually by equal intervals, and the protrusions 50, 62, 72, 82, 92 may be arranged in such a manner that they are separated by non-equal intervals. More specifically, the protrusions 50, 62, 72, 82, 92 may be disposed at positions capable of suppressing the occurrence of distortion in the diaphragm portion 56 when a load is applied from the holder 16.

Figure 5:
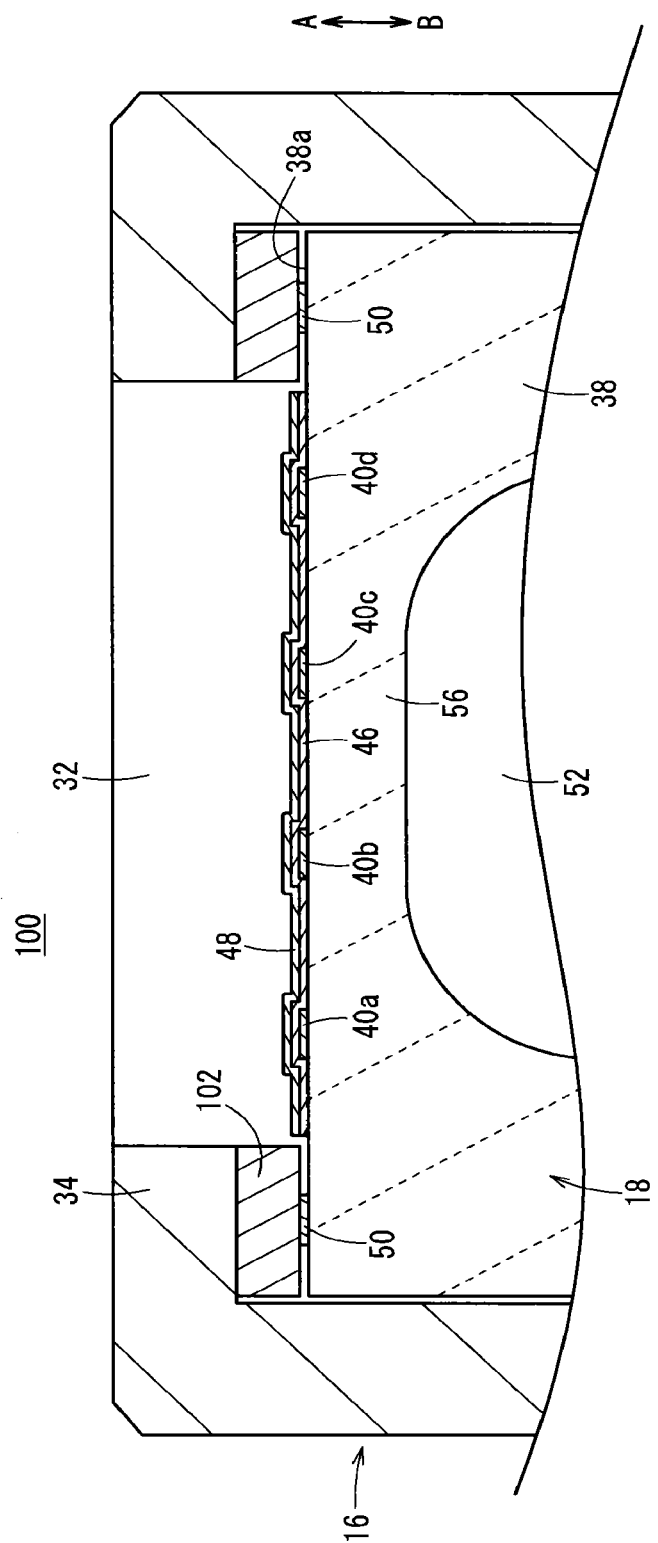
FIG. 5 is an enlarged cross-sectional view showing the vicinity of a sensor of a pressure sensor according to a modification.

Further, the invention is not limited to the configurations described above, in which the load from the holder 16 is received directly by the protrusions 50. For example, as in a pressure sensor 100 shown in FIG. 5, an annular shaped spacer 102 may be disposed between the holder 16 and the protrusions 50 of the sensor 18, such that when the holder 16 is assembled, an applied vertical load may be received by the protrusions 50 through the spacer 102. The spacer 102 is formed, for example, from brass or stainless steel.

In this manner, by interposing the spacer 102 between the holder 16 and the sensor 18 and placing the spacer 102 beforehand in abutment with the protrusions 50 when the holder 16 is fastened to the body 14 while being rotated, sliding between the holder 16 and the protrusions 50 can be prevented. Therefore, damage and abrasion, i.e., scratching and wear, to the protrusions 50 do not occur, and the protrusions 50 can be maintained at a fixed height at all times.

Further, when the holder 16 is fastened with respect to the body 14, depending on the surface roughness of the pressing portion 34 of the holder 16, the axial force (fastening force) may be lowered by frictional forces at the time of contact. However, by providing the spacer 102, the axial force is imposed on the sensor 18 through the spacer 102, and thus it becomes possible to fix the sensor 18 more firmly with a predetermined fastening force.

Furthermore, by providing the spacer 102 in the form of a washer made up from a material having a somewhat lower hardness than that of the protrusions 50, the spacer 102 can be placed in surface contact with respect to the protrusions 50 which have a certain amount of concave/convex irregularity. Thus, it is possible to reduce the surface pressure that is imposed on the protrusions 50. As a result, cracking, etc., of the protrusions 50, which is of concern in the case of point contact with respect to the protrusions 50, can be prevented.

Further still, by forming the spacer 102 from a material of lower hardness than the holder 16, the vertical load applied from the holder 16 is suitably dispersed by the spacer 102, and application of the load to the side of the sensor 18 can be alleviated. Consequently, distortion of the resistive bodies 40a through 40d provided on the sensor 18 can be further suppressed, and it is possible to achieve a reduction in the offset voltage.

The pressure sensor according to the present invention is not limited to the embodiment described above, and it is a matter of course that various structures or configurations may be adopted therein without deviating from the scope of the present invention as defined by the appended claims.

What is claimed is:

1. A pressure sensor comprising a body including a fluid passage into which a pressure fluid is introduced, a ceramic sensor disposed on an end of the body and including a thin-film diaphragm portion that faces toward the fluid passage, and a holder connected to the end of the body in a state in which the sensor is accommodated in an interior thereof, wherein the sensor is fixed by being pressed toward the body by a pressing portion formed on an outer edge portion of the holder;

wherein, resistive bodies are disposed on the diaphragm portion positioned on a central portion of the sensor, and a protrusion, which projects toward the holder, is disposed at a position facing toward the pressing portion on an outer circumferential side of the resistive bodies.

2. The pressure sensor according to claim 1, wherein the protrusion comprises a plurality of protrusions that are disposed so as to be separated mutually along a circumferential direction of the sensor.

3. The pressure sensor according to claim 2, wherein the protrusions are formed with rectangular shapes in cross section or circular shapes in cross section.

4. The pressure sensor according to claim 1, wherein the resistive bodies are covered by a protective film.

5. The pressure sensor according to claim 1, further comprising a spacer that is sandwiched between the holder and the sensor.

6. The pressure sensor according to claim 5, wherein the spacer is formed from a material with lower hardness than the holder.

7. The pressure sensor according to claim 1, wherein the protrusions are formed together with the resistive bodies by screen printing.

* * * * *